United States Patent
Feldmann et al.

(10) Patent No.: US 9,435,635 B1
(45) Date of Patent: Sep. 6, 2016

(54) SYSTEM AND METHODS OF DETECTING AN INTRUDING OBJECT IN A RELATIVE NAVIGATION SYSTEM

(71) Applicant: GE Aviation Systems LLC, Grand Rapids, MI (US)

(72) Inventors: Michael Steven Feldmann, Rockford, MI (US); Frank Saggio, III, Grand Rapids, MI (US); Timothy John Paasche, Grand Rapids, MI (US); Mark Lawrence Turner, Grand Rapids, MI (US); John Andrew Ingersoll, Plainwell, MI (US)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 0 days.

(21) Appl. No.: 14/633,231

(22) Filed: Feb. 27, 2015

(51) Int. Cl.
G05D 1/03 (2006.01)
G01B 11/00 (2006.01)
G01C 21/00 (2006.01)

(52) U.S. Cl.
CPC .............. G01B 11/002 (2013.01); G01C 21/00 (2013.01)

(58) Field of Classification Search
USPC ........ 353/11, 12; 342/33, 34, 35, 52, 53, 54, 342/55, 56; 701/3, 16, 300, 120, 14, 15, 23, 701/301, 4, 408, 467
See application file for complete search history.

(56) References Cited

U.S. PATENT DOCUMENTS

| | | | | |
|---|---|---|---|---|
| 3,604,512 A | * | 9/1971 | Carter | ..................... E02F 3/847 172/4.5 |
| 3,690,594 A | | 9/1972 | Menke | |
| 4,149,686 A | * | 4/1979 | Stauff | ....................... G01S 1/70 244/3.13 |
| 4,174,818 A | * | 11/1979 | Glenn | .................... G02B 26/08 244/3.13 |
| 4,189,703 A | | 2/1980 | Bennett | |
| 4,195,799 A | * | 4/1980 | Sogo | ........................ G05D 1/12 244/3.13 |
| 4,232,313 A | | 11/1980 | Fleishman | |
| 4,243,187 A | | 1/1981 | Esker | |
| 4,245,800 A | * | 1/1981 | Henderson | ............. F41G 7/263 244/3.13 |
| 4,299,360 A | | 11/1981 | Layton | |
| 4,406,430 A | | 9/1983 | Krammer et al. | |
| 4,441,669 A | * | 4/1984 | Wich | ...................... F41G 7/263 244/3.13 |
| 4,490,719 A | | 12/1984 | Botwin et al. | |
| 4,709,875 A | * | 12/1987 | Cremosnik | .............. F41G 7/26 244/3.13 |
| 4,710,028 A | | 12/1987 | Grenier et al. | |

(Continued)

FOREIGN PATENT DOCUMENTS

EP 0609162 A2 8/1994
EP 2256573 A2 12/2010

OTHER PUBLICATIONS

A Vision-Based Automatic Landing Method for Fixed-Wing UAVs by Sungsik Huh and David Hyunchul Shim, Published online: Oct. 23, 2009, © Springer Science + Business Media B.V. 2009.

(Continued)

Primary Examiner — Thomas Tarcza
Assistant Examiner — Richard Goldman
(74) Attorney, Agent, or Firm — GE Global Patent Operation; William S. Munnerlyn (57) ABSTRACT

A relative navigation system and methods of intrusion detection for such a relative navigation system where the method includes repeatedly projecting from a grid generator a set of lines defining a grid into three dimensional space to define a field bounded by the grid and encoded with grid data configured to identify predetermined points on the grid and determining a presence of an intruding object within the field.

20 Claims, 5 Drawing Sheets

(56) References Cited

U.S. PATENT DOCUMENTS

| | | |
|---|---|---|
| 5,056,736 A | 10/1991 | Barton |
| 5,082,201 A | 1/1992 | Le Bars et al. |
| 5,155,775 A | 10/1992 | Brown |
| 5,214,408 A * | 5/1993 | Asayama ............ G01S 11/12 180/167 |
| 5,291,195 A | 3/1994 | Gross |
| 5,344,099 A | 9/1994 | Pittman et al. |
| 5,379,966 A | 1/1995 | Simeone et al. |
| 5,427,328 A | 6/1995 | Tong et al. |
| 5,533,692 A | 7/1996 | Layton |
| 5,815,411 A * | 9/1998 | Ellenby ............... G01C 17/34 345/9 |
| 5,970,433 A * | 10/1999 | Oka .................... G01S 7/4811 250/559.13 |
| 6,193,190 B1 | 2/2001 | Nance |
| 6,275,751 B1 | 8/2001 | Stallard et al. |
| 6,278,917 B1 | 8/2001 | Bauer et al. |
| 6,371,405 B1 * | 4/2002 | Sallee ................. F41G 7/2213 244/3.15 |
| 6,441,367 B1 * | 8/2002 | Gladnick ............. G01B 11/00 250/237 G |
| 6,504,610 B1 | 1/2003 | Bauer et al. |
| 6,735,279 B1 * | 5/2004 | Jacobs ................ G01N 23/201 378/86 |
| 6,765,523 B2 * | 7/2004 | Ono .................... G01S 7/411 342/104 |
| 6,845,303 B1 | 1/2005 | Byler |
| 7,002,488 B2 * | 2/2006 | Kohlmeier-Beckmann B64F 1/36 340/431 |
| 7,093,801 B2 | 8/2006 | Schroeder |
| 7,301,536 B2 * | 11/2007 | Ellenby ............... G01C 17/34 345/419 |
| 7,346,437 B2 | 3/2008 | Petillon |
| 7,418,343 B1 | 8/2008 | McGraw et al. |
| 7,598,848 B2 * | 10/2009 | Takagi ................ G06K 9/00805 180/275 |
| 7,681,839 B2 * | 3/2010 | Mickley ............... G01S 1/70 244/135 A |
| 8,019,538 B2 | 9/2011 | Soehren et al. |
| 8,104,716 B2 | 1/2012 | Mickley et al. |
| 8,244,403 B2 * | 8/2012 | Lin .................... G05D 1/0246 180/168 |
| 8,244,455 B2 | 8/2012 | Case et al. |
| 8,311,695 B2 | 11/2012 | McKitterick |
| 8,326,523 B2 * | 12/2012 | Stimac ................ G01C 21/24 348/136 |
| 8,352,100 B2 * | 1/2013 | Stimac ................ B64G 1/646 348/136 |
| 8,354,951 B2 * | 1/2013 | Guigne ............... G01S 13/878 342/118 |
| 8,386,096 B2 | 2/2013 | Stimac et al. |
| 8,442,706 B2 | 5/2013 | Doeppner et al. |
| 8,463,463 B1 * | 6/2013 | Feldmann ............ G05D 1/104 33/431 |
| 8,872,081 B2 * | 10/2014 | Feldmann ............ G01C 21/24 244/3.1 |
| 9,170,435 B2 * | 10/2015 | Lopez ................. G02F 1/01 |
| 2001/0018640 A1 * | 8/2001 | Matsunaga ......... G05D 1/0246 701/301 |
| 2003/0043058 A1 * | 3/2003 | Jamieson ............ G01S 17/933 340/961 |
| 2004/0032596 A1 | 2/2004 | Lange et al. |
| 2005/0052718 A1 | 3/2005 | De Shon |
| 2006/0106507 A1 * | 5/2006 | Ledet ................. G05B 19/4207 701/23 |
| 2008/0027591 A1 * | 1/2008 | Lenser ................ G05D 1/0251 701/2 |
| 2008/0067290 A1 | 3/2008 | Mickley et al. |
| 2008/0297740 A1 | 12/2008 | Huynh et al. |
| 2009/0138138 A1 | 5/2009 | Ferren et al. |
| 2009/0306840 A1 * | 12/2009 | Blenkhorn .......... G05D 1/0676 701/16 |
| 2009/0326736 A1 | 12/2009 | Waid |
| 2010/0066595 A1 * | 3/2010 | Lee et al. ............. G01S 7/412 342/179 |
| 2010/0161155 A1 * | 6/2010 | Simeray ............. A63H 27/12 701/3 |
| 2010/0228408 A1 * | 9/2010 | Ford ................... G01C 21/165 701/16 |
| 2011/0153205 A1 * | 6/2011 | Stimac ................ G01C 21/24 701/408 |
| 2011/0153210 A1 * | 6/2011 | Stimac ................ B64G 1/646 701/300 |
| 2012/0001017 A1 * | 1/2012 | Strachan ............. B64B 1/00 244/24 |
| 2012/0076397 A1 | 3/2012 | Moresve |
| 2012/0130566 A1 * | 5/2012 | Anderson ........... G05D 1/0684 701/16 |
| 2012/0150364 A1 * | 6/2012 | Tillotson ............. G05D 1/101 701/3 |
| 2012/0158222 A1 * | 6/2012 | Ehlin ................... G01S 17/023 701/16 |
| 2013/0107219 A1 * | 5/2013 | Feldmann ........... G01C 21/24 353/11 |
| 2014/0035775 A1 * | 2/2014 | Zeng ................... G01S 13/867 342/52 |
| 2014/0067165 A1 * | 3/2014 | Buehler .............. G01S 17/88 701/3 |
| 2014/0268269 A1 * | 9/2014 | Lopez ................. G02F 1/01 359/200.7 |
| 2015/0379876 A1 * | 12/2015 | Navot ................. G08G 5/0021 701/301 |

OTHER PUBLICATIONS

Design of a Shipboard Recovery System for a Shrouded-Fan UAV, Giulio Avanzini, Guido de Matteis Turin Polytechnic, Dept. of Aeronautical and Space Engineering, University of Rome "La Sapienza", Dept. of Mechanics and Aeronautics, ICAS 2002 Congress.

EP Search Report issued on Jul. 16, 2016 in connection with corresponding EP Application 16157663.2.

* cited by examiner

SYSTEM AND METHODS OF DETECTING AN INTRUDING OBJECT IN A RELATIVE NAVIGATION SYSTEM

BACKGROUND OF THE INVENTION

Relative navigation systems are useful for various applications such as autonomous vehicle navigation in a warehouse or factory environment, mid-air refueling, and space docking. In some applications, only the relative positions (Px, Py, Pz, or Azimuth, Elevation, Slant Range) between two objects is required. In other applications, the relative range, as well as the relative velocity (Vx, Vy, Vz, or Azimuth Rate, Elevation Rate, Slant Range Rate) and the relative attitudes (pitch, roll, and yaw) between two objects are required. Further, statistics that quantify the overall Actual Navigation Performance (ANP), in terms of Continuity, Integrity, Availability, and Accuracy (CIAA) of the relative navigation solutions, above, can be developed to allow determination of whether the ANP meets the Required Navigation Performance (RNP) for the navigation operation being conducted. In total, the relative navigation information plus the ANP statistics constitute the Navigation State Vector of the system.

In the specific case of unmanned aerial vehicles (UAVs), which are aircraft that fly without onboard pilots, relative navigation systems can be particularly useful as UAVs rely on complete or partial automation for control during their takeoff, flight, and landing. UAVs have become increasingly popular but the logistical complexity of UAV control makes their use burdensome. UAV landings are typically done at locations having traditional landing aids such as Instrument Landing Systems (ILS), Very High Frequency Omnibearing Receivers (VOR), Distance Measuring Equipment (DME) Microware Landing Systems (MLS), RADAR, etc., which aid the remote pilot, or the onboard autopilot in the case of totally autonomous systems, in landing the aircraft and/or provide for automated landings. However, it is often desirable to launch and land UAVs at locations where the infrastructure for traditional landing aids is not available, which limits the flexibility of the UAV.

With or without an onboard pilot, UAVs can be susceptible to an object intruding into the landing zone, especially temporary intrusions that occur during the act of landing. Current relative navigation systems are not able to detect such intrusions.

BRIEF DESCRIPTION OF THE INVENTION

In one aspect, an embodiment of the invention relates to a method of intrusion detection for a relative navigation system, including repeatedly projecting from a grid generator a set of lines defining a grid into three dimensional space to define a field bounded by the grid, with the lines encoded with grid data configured to identify predetermined points on the grid and determining a presence of an intruding object within the field.

In another aspect, an embodiment of the invention relates to a relative navigation system including a grid generator projecting into space a relative navigation grid and a detector module for determining a presence of an intruding object that is not intended as a receiver of the relative navigation grid and configured to output a signal related to the presence of the intruding object.

DESCRIPTION OF EMBODIMENTS OF THE INVENTION

Figure 1:
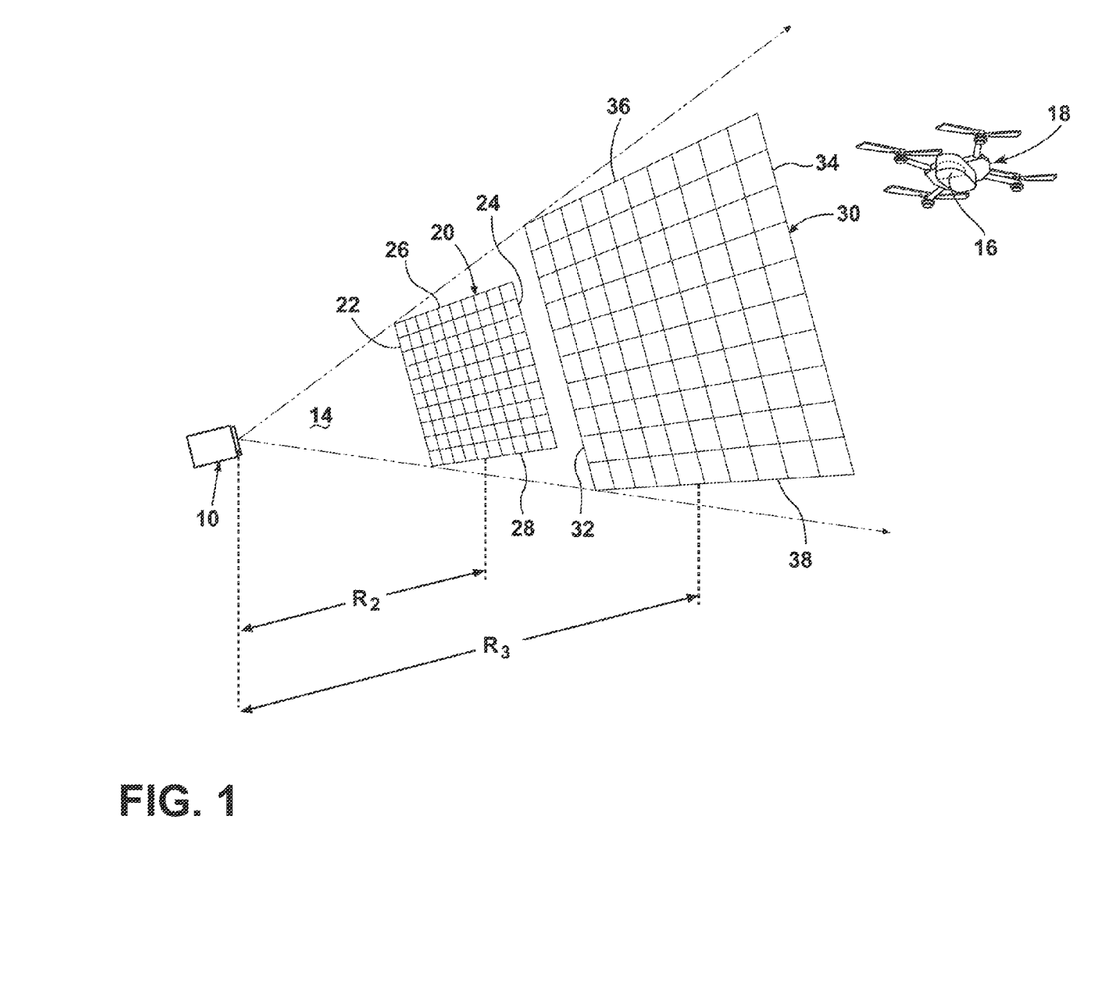
FIG. 1 is a perspective view of a UAV and a grid generator according to an embodiment of the invention.

The embodiments of the present invention are related to methods and apparatus for projecting a grid from a grid generator of a relative navigation system and detecting intruding objects within the projected grid. The relative navigation system can be used for a variety of applications including landing any type of aircraft and is particularly well suited for landing UAVs. FIG. 1 illustrates an embodiment of a grid generator 10, which can project a grid, such as a set of intersecting lines, into space within a field such as a field of transmission or field of regard (FOR) 14. More specifically, the grid generator 10 repeatedly projects the grid into three-dimensional space to define the FOR 14. The general details of how to project the grid are known in the art, which include the disclosure in U.S. Pat. No. 7,681,839, issued Mar. 23, 2010, entitled Optical Tracking System For Refueling, and U.S. Pat. No. 8,386,096, issued Feb. 26, 2013, entitled Relative Navigation System, both of which are incorporated by reference. Therefore, the general details of the grid generation will not be fully described in this application.

As illustrated, the projected grid includes intersecting lines. At some distance away from the grid generator 10, these intersecting lines are observed as a grid in space, with the size of the grid increasing away from the grid generator 10. The grid in space generated by the grid generator 10 can be detected by a detector module 16 of a moveable object, which can then maneuver itself based upon the detected grid. For purposes of this discussion the moveable object will be described as a UAV 18 having the detector module 16. For relative navigation between the grid generator 10 and the UAV 18 it is presumed that the detector module 16 of the UAV 18 lies within the field of transmission of the grid generator 10, enabling the detector module 16 to "see" the grid.

For description purposes, the grid generator 10 can be thought of as projecting intersecting lines substantially in the y direction of the coordinate system. If one were to observe the projection of intersecting lines in the x-z plane at some distance $R_2$ away from the grid generator 10, one would observe a first grid 20. If one were to observe the same projection of intersecting lines at a distance $R_3$, which is greater than the first distance $R_2$ in the x-z plane, one would observe a second grid 30, which appears relatively larger than the first grid 20.

The first grid 20 at a distance $R_2$ away from the grid generator 10 is spatially bound in the horizontal direction by a first vertical line 22 and a second vertical line 24. There exists a set of vertical lines spatially and temporally generated in between the first vertical line 22 and the second vertical line 24. The first grid 20 at a distance $R_2$ away from the grid generator 10 is spatially bound in the vertical direction by a first horizontal line 26 and a second horizontal line 28. There exists a set of horizontal lines spatially and temporally generated in between the first horizontal line 26 and the second horizontal line 28. The distance $R_2$ can be any distance between the grid 20 and the grid generator 10.

The second grid 30 at a distance $R_3$ away from the grid generator 10 is for all practical purposes the same as the first grid 20, but at further distance from the grid generator 10 than the first grid 20. The grid 30 is spatially bound in the horizontal direction by a first vertical line 32 of the second grid 30 and a second vertical line 34 of the second grid 30. There exists a set of vertical lines spatially and temporally generated in between the first vertical line 32 of the second grid and the second vertical line 34 of the second grid. The second grid 30 at a distance $R_3$ away from the grid generator 10 is spatially bound in the vertical direction by a first horizontal line 36 of the second grid 30 and a second horizontal line 38 of the second grid 30. There exists a set of horizontal lines spatially and temporally generated in between the first horizontal line 36 of the second grid and the second horizontal line 38 of the second grid.

The similarity of the grids 20 and 30 becomes apparent in the case of projected grid lines, where the grid 30 is formed by the same lines forming the grid 20, except that the grid 30 is observed at a further distance from grid generator 10, making the grid 30 appear larger than the grid 20. In this sense, the grid 30 is the appearance of the grid lines generated by the grid generator at the distance $R_3$ whereas the grid 20 is the appearance of the grid lines at the distance $R_2$.

The grids 20 and 30 can be of any number of lines. As illustrated, they include ten vertical lines by ten horizontal lines. A grid including a greater number of intersecting lines can result in improved detection for a fixed FOR 14 and distance from the detector module 16 than a grid including a fewer number of intersecting lines. The grids 20 and 30 are depicted as a square shape, but this is not a requirement. The grid can be any shape including rectangular, oval, or circular. Furthermore, the intersecting lines of the grids 20 and 30 are depicted as orthogonal; however, this is not a requirement. The angles between the intersecting lines can be right angles, acute angles, or obtuse angles in different parts of the grid.

The vertical and horizontal lines can be formed in any suitable manner by the grid generator 10. For example, all of the lines can be formed sequentially or all at once. Either one of the vertical lines or horizontal lines can be formed before the other. The grid generator can alternate between vertical and horizontal lines. When the grid generator 10 uses a scanning laser to form the grid, the laser will sequentially form all of one of the vertical and horizontal lines, followed by the sequential forming of the other of the vertical and horizontal lines. The rate at which the lines are sequentially formed can be so fast that for practical purposes, it is as if all of the grid lines were simultaneously formed. The radiation source for the set of projected lines can be a coherent or incoherent radiation source. For example, when the radiation source is a coherent source, it can be a solid state laser that emits radiation at a wavelength in the near-UV range. Additionally, the radiation frequency and/or intensity can be selected, or attenuated by use of an optical filter, to reduce the risk of eye damage. The grid of intersecting projected lines can be generated by raster scanning each of the lines or by projecting and scanning an elongated radiation beam. Any suitable methods and apparatus for generating the intersecting lines can be used.

Although, examples shown use Cartesian coordinates, any appropriate coordinate system can be used including polar, cylindrical, or spherical coordinate systems for both grid generation and for grid detection. For example, to form a grid amenable to polar coordinate representation, a series of concentric circles and lines radiating out from the center of those circles can be projected by the grid generator into space.

Grid data can be included, embedded, or otherwise encoded at one or more locations of the grid. By grid data, it is meant that the structure or characteristic of the grid provides data or information that can be read or detected by the detector module 16. In one embodiment, the projected lines including the series of projected intersecting lines are encoded with different grid data in different regions of the grid to indicate regions within the grid of intersecting lines. In this manner, the lines encoded with grid data are configured to identify predetermined points on the grid. One manner of encoding of the grid data is by modulating the beam in the case of a laser being used to form the grid. The modulation is achieved by changing the intensity of the beam and/or blocking the beam with some periodicity. Such a grid data can include a number and it is contemplated that each of the grid lines can include a number, which identifies the grid line to the detector module 16 of the UAV 18.

Embodiments of the invention include the ability to detect intruding objects within the FOR 14. Navigation of aircraft in the vicinity of intruding objects animate or inanimate, particularly during landing and takeoff operations, can be hazardous not only to the aircraft, and any accompanying passengers or payloads, but also to proximate structures and personnel. This problem can be compounded in adverse environmental conditions, such as, night, glare, reflected light, direct sunlight, or the presence of particulates such as visible moisture including rain, fog, snow, dust. This problem is further still exacerbated if the navigating aircraft is unmanned. As used herein, the term intruding object includes any object, known or unknown, within the FOR 14. In the case of known intruding objects, the determined presence of those objects confirms the location of the grid generator and act as markers.

Figure 2:
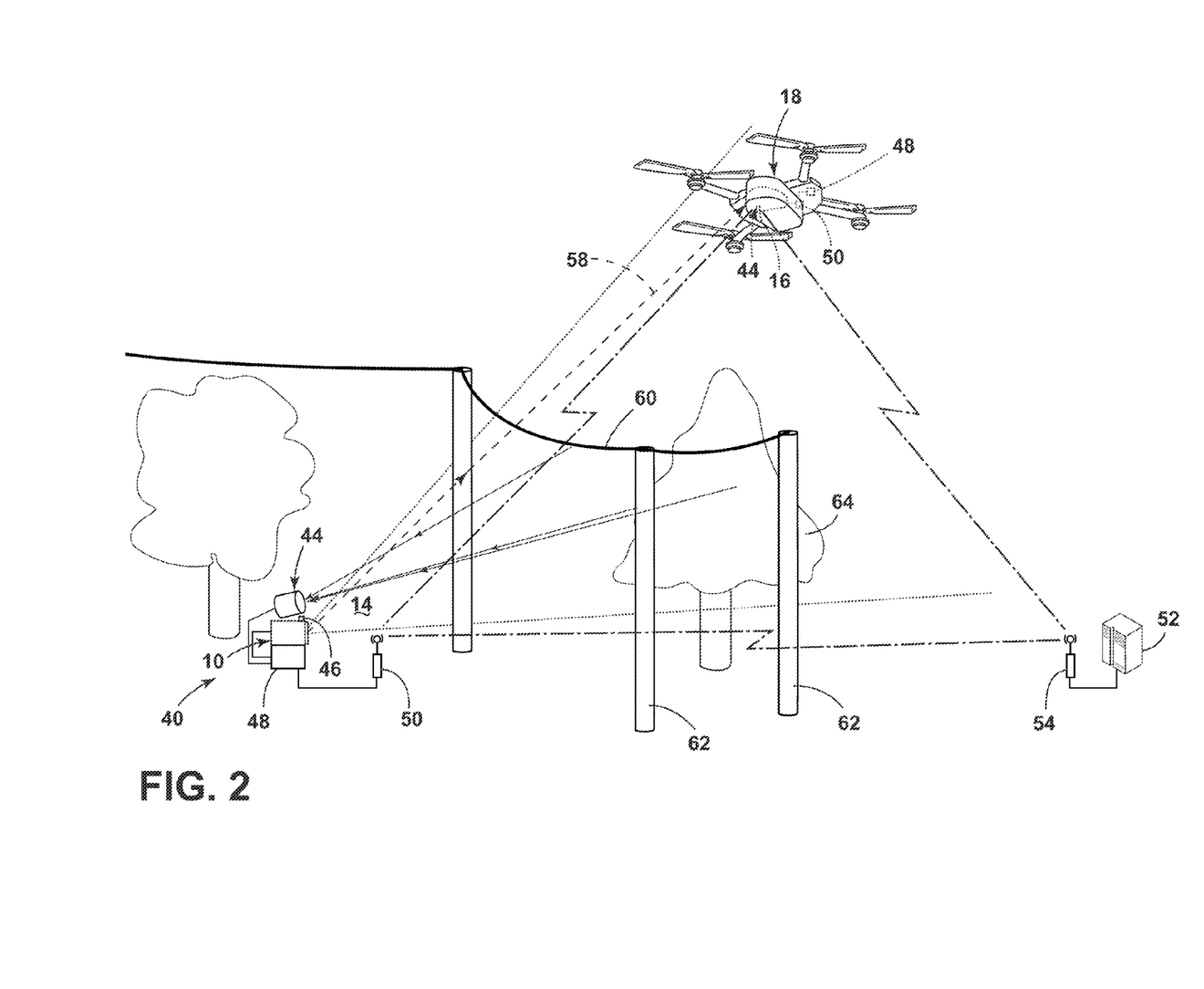
FIG. 2 is a schematic illustration of a relative navigation system that can detect intruding objects.

FIG. 2 is a schematic illustration of a relative navigation system 40 that can detect intruding objects. It is contemplated that a grid generator 10 as previously described can be included in the relative navigation system 40 and can reside on, or in the vicinity of, an aircraft landing site especially a UAV landing site, with the landing site being either stationary or moving. Further, a detector module 44 for determining a presence of an intruding object that is not intended as a receiver of the relative navigation grid can be included in the relative navigation system 40. Such a detector module 44 can be configured to output a signal related to the presence of the intruding object. It will be understood that any suitable detector module 44 can be utilized. By way of non-limiting example, the detector module 44 can include a detector module located near the grid generator 10 and that is configured to detect retro-reflected light or backscatter. Retro-reflected light is caused by an intruding object that reflects light back to its source with a minimum of scattering. The retro-reflected light is reflected back along a vector that is parallel to but opposite in direction from the wave's source. Backscatter is caused by the reflection of light from an intruding object such that an incident ray is reflected at many angles rather than at just one angle. Depending on the medium of the intruding object a greater or lesser portion of the light is reflected. Thus, this means of detection does not require equipment to be installed or located on the UAV.

By way of further non-limiting example, the detector module 44 can also be included in the detector module 16 on the UAV. This allows for the detector module 16 on the UAV 18 to determine the presence of intruding objects without having to have a detector module near the grid generator 10. When the detector module 44 is included in the detector module on the UAV, the detector module 44 is configured to detect a multi-path reflection, or as a loss of light from the grid that is caused by the intruding object blocking direct line of sight. The multi-path reflection may be caused by a glancing reflection, at a low angle of incidence, from an intruding object. Either case indicates presence of an intruding object within the FOR 14 by means equipped on the UAV 18. The detector module or a processor operably coupled thereto may determine that the multi-path reflection is different from the remainder of the grid received and can determine the presence of the intruding object based thereon. Detection of loss of light caused by an intruding object includes an intruding object blocking a portion of the grid as well as reducing an intensity of the light received. Regardless of where the detector module 44 is located at the landing zone or on the aircraft, it will be understood that the light of the grid 20 can be utilized to determine the presence of the intruding object. It will be understood that any number of detector modules 44 can be utilized to determine a presence of an intruding object including, but not limited to, that numerous detector modules 44 can be located near the grid generator 10.

In one example, detection of backscatter of any light is an indication of an intruding object in the FOR 14. In another embodiment, a precision time base is used in conjunction with detection of backscatter to perform time-of-flight (TOF) measurements leading to the ability to determine the range of the object from the grid generator 10. More specifically, a processor 48 can measure the time elapsed from light transmission to reception so that the range at which the projected light beam is backscattered can be determined. In this manner, the processor 48 can be included in the relative navigation system 40 for aiding in determining a presence of the intruding object. As illustrated the processor 48 can be operably coupled to a detector module near the grid generator 10 or one that is located on the UAV 18.

It will also be understood that a secondary light source 46 can be included in the relative navigation system 40 and the detector module 44 can determine the presence of the intruding object based on a projection from the secondary light source 46. In this manner, light from the grid generator 10 does not need to be utilized to determine a presence of an intruding object. Any suitable secondary light source 46 can be utilized including, but not limited to, an unscanned laser dot, a scanned laser dot, a flash laser, etc. In the case of the unscanned laser dot it will be understood that the projection can have dispersion sufficient to cover the FOR 14. Similarly, the scanned laser dot or line can also cover the FOR 14. The secondary light source can be activated during normal grid scanning if the frequency is distinct from the grid frequency such that it does not interfere. Alternately, it can be activated before, after, or between grid projections.

Regardless of the location of the processor 48, the processor 48 can be operably coupled with a communication link 50 such that information can be transmitted to and from the processor 48. It is contemplated that the communication link 50 can be a wireless communication link and can be any variety of communication mechanism capable of wirelessly linking with other systems and devices and can include, but is not limited to, packet radio, satellite uplink, Wireless Fidelity (WiFi), WiMax, Bluetooth, ZigBee, 3G wireless signal, code division multiple access (CDMA) wireless signal, global system for mobile communication (GSM), 4G wireless signal, long term evolution (LTE) signal, Ethernet, optical data link suitable for emission-controlled operations, or any combinations thereof. It will also be understood that the particular type or mode of wireless communication is not critical to embodiments of the invention, and later-developed wireless networks are certainly contemplated as within the scope of embodiments of the invention. Further, the communication link 50 can be communicably coupled with the processor 48 through a wired link without changing the scope of embodiments of the invention. Further still, the communication link 50 can be a wired communication link that can be physically coupled with a component or system to transfer information thereto. Although only one communication link 50 has been illustrated on the UAV 18, it is contemplated that the UAV 18 can have multiple communication links communicably coupled with the processor 48. Such multiple communication links can provide the UAV 18 with the ability to transfer flight data information off the UAV 18 in a variety of ways.

Further still, the signal from either of the illustrated detector modules 44 or a signal from either of the illustrated processors 48 can be communicated wirelessly to a remote processor 52 having its own wireless communication link 54. The remote processor 52 can be located at any suitable designated ground station. It will be understood that either of the processors 48 and/or the remote processor 52 can be configured to determine a presence of the intruding object.

Figure 3:
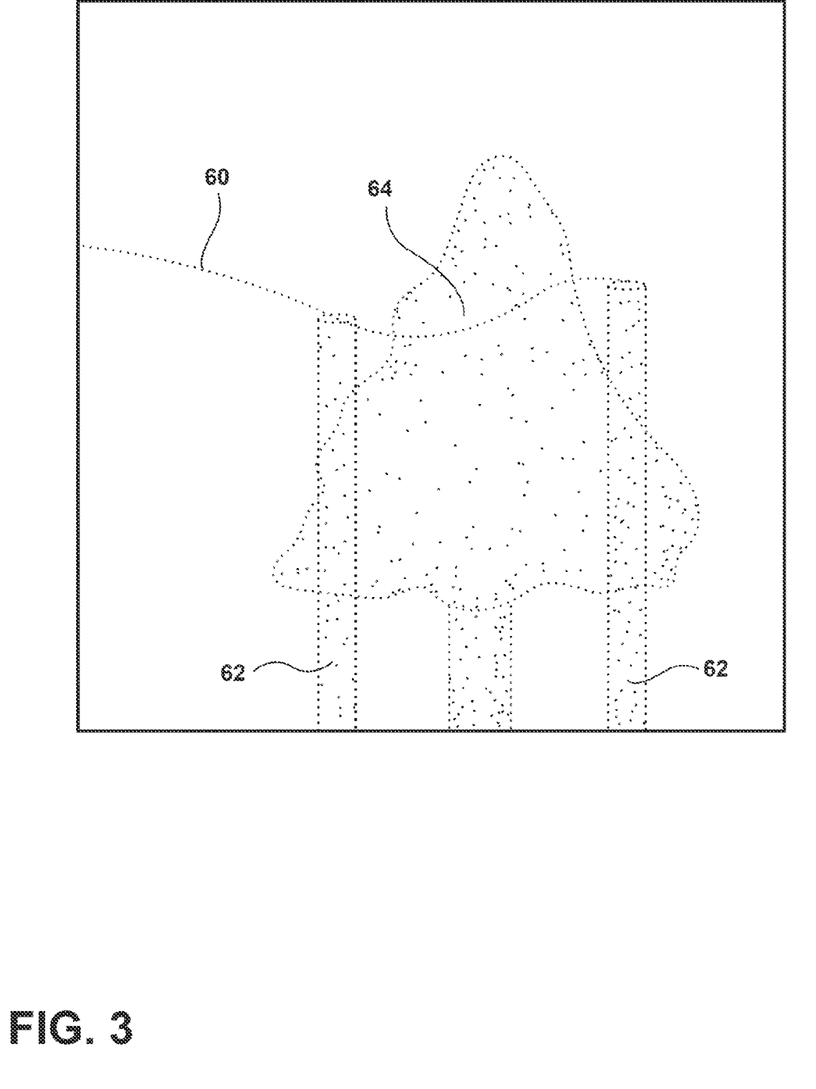
FIG. 3 is a schematic illustration of a point cloud that can be formed in detecting an intruding object.

Further still, processors 48 and/or the remote processor 52 can be configured to identify and classify the intruding obstacle. In the illustrated example of FIG. 2 the grid or at least a portion thereof is received by the detector module 44 on the UAV at 58. Several intruding objects can also be detected as being in the FOR 14 including a power line 60, poles 62, and a tree 64. By way of non-limiting example, the processor 48 can identify the intruding object by receiving output signals from the detector module 44 and forming a point cloud image therefrom. More specifically, reflected light can be used to form a point cloud image that is intended to represent the external surface of the intruding object(s). FIG. 3 illustrates a point cloud image formed from reflected light in the exemplary illustration of FIG. 2. The processor 48 can identify objects including the power line 60, poles 62, and the tree 64 from the point cloud image and relay such information. Alternatively, the point cloud image itself can be relayed to another processor or a user who can identify the objects. It is also contemplated that the intruding objects can be classified by the processor 48, the remote process 52, or by a user. By way of non-limiting example, the processor 48 can be utilized to determine if the backscatter from an object is a threat or not a threat. For example, the backscatter may be utilized to determine a size of the intruding object as well as a location of the intruding object and such information may be utilized to classify whether the object is a threat or not. By way of non-limiting examples, one intruding object can be a bird too small to inflict damage and thus would be classified as a non-threat, one can be determined to be from the tree 64 and another from the power line 60, both of which can pose a threat that can be maneuvered around or can preclude the landing operation. Further still, the processor 48 or the processor 52 based on a measure of the time elapsed from light transmission to reception can determine whether an intruding object is stationary or moving, as well as the speed at which it is moving.

Figure 4:
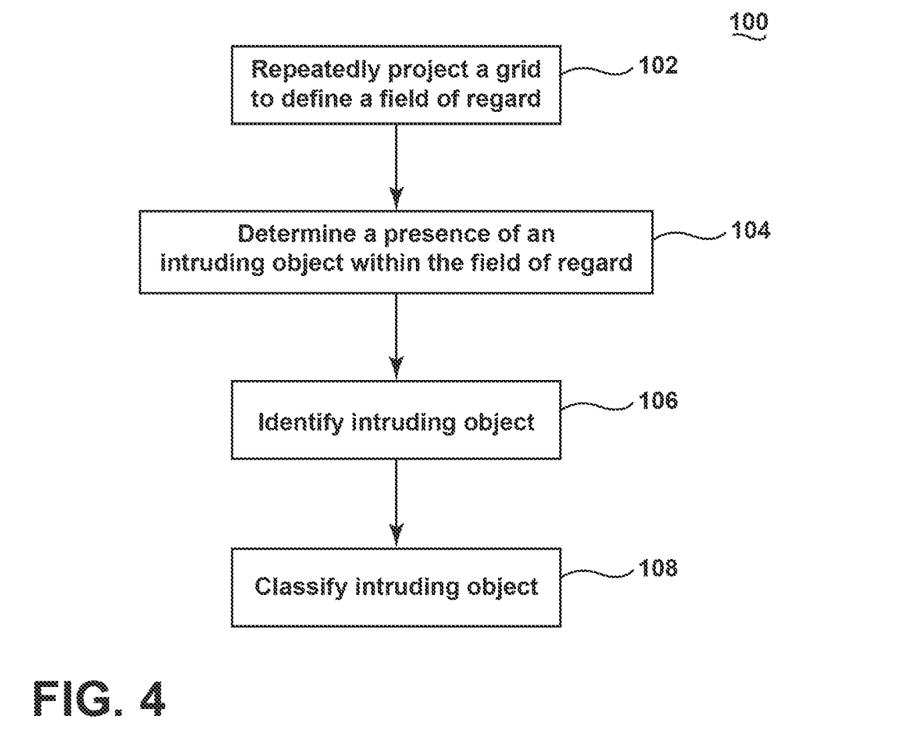
FIG. 4 is a flow chart of an embodiment of a method of intrusion detection for a relative navigation system.

FIG. 4 illustrates a method 100 of detecting an intruding object according to one embodiment of the invention. The method 100 includes at 102 repeatedly projecting from a grid generator, such as the grid generator 10, a set of lines defining a grid into three dimensional spaced to define a FOR 14. It will be understood that repeatedly projecting can include projecting sets of lines at predetermined time intervals, projecting sets of lines randomly, and projecting sets of lines in any suitable manner such that the FOR 14 is defined and can be utilized in a relative navigation system.

At 104, a presence of an intruding object within the FOR 14 can be determined. Any suitable method for determining the presence of the intruding object can utilized including, but not limited to, detection of retro-reflected light or backscatter by detector modules located at or near the grid generator, detection of transmitted light resulting from multi-path reflection off of an object or objects in the FOR 14 by detector modules located on an intended receiver of the grid such as the UAV 18, or detection of loss of light caused by an object or objects blocking transmission of light from the grid generator 10 to detector module(s) located on an intended receiver such as the UAV 18.

Identification and classification of the intruding object(s) can also be included in the method 100. Such identification and classification improve situational awareness and decision making regarding the level of hazard the intruding object(s) can constitute, and guides appropriate response. At 106, the intruding object may be identified. Identification of the intruding object may include, but is not limited to, identifying what the object is and where the object is located. By way of non-limiting example, identify the intruding object may include that backscattered light can be used to form a point cloud image that is intended to represent the external surface of the intruding object(s). The processor 48 or the remote processor 52 can use image processing techniques to identify the intruding object(s) or the point cloud image can be provided to a user who can identify the objects.

At 108, the intruding object can be classified. This can include, but is not limited to, classifying the intruding object as either a known object or an unknown object. For example, objects such as the power line 60, poles 62, and the tree 64 may be known based on a known location of the grid generator 10 and may simply provide a marker to be navigated around. Additional intruding objects, such as by way of non-limiting examples a vehicle or bird may be unknown. Further, classifying the intruding object can include classifying the threat level of the intruding object. For example, a bird may not pose a threat, a tree may pose a threat that can be maneuvered around, and an unknown vehicle can be a threat that can preclude the landing or takeoff operation.

It should be noted that the sequence depicted is for illustrative purposes only and is not meant to limit the method 100 in any way. It will be understood that the portions of the method can proceed in a different logical order, additional or intervening portions can be included, or described portions of the method can be divided into multiple portions, or described portions of the method can be omitted without detracting from the described method. By way of non-limiting example, the method 100 can include projecting light from a secondary light source either during or separate from the projection of the grid and determining the presence of the intruding object based on light from the secondary light source.

Figure 5:
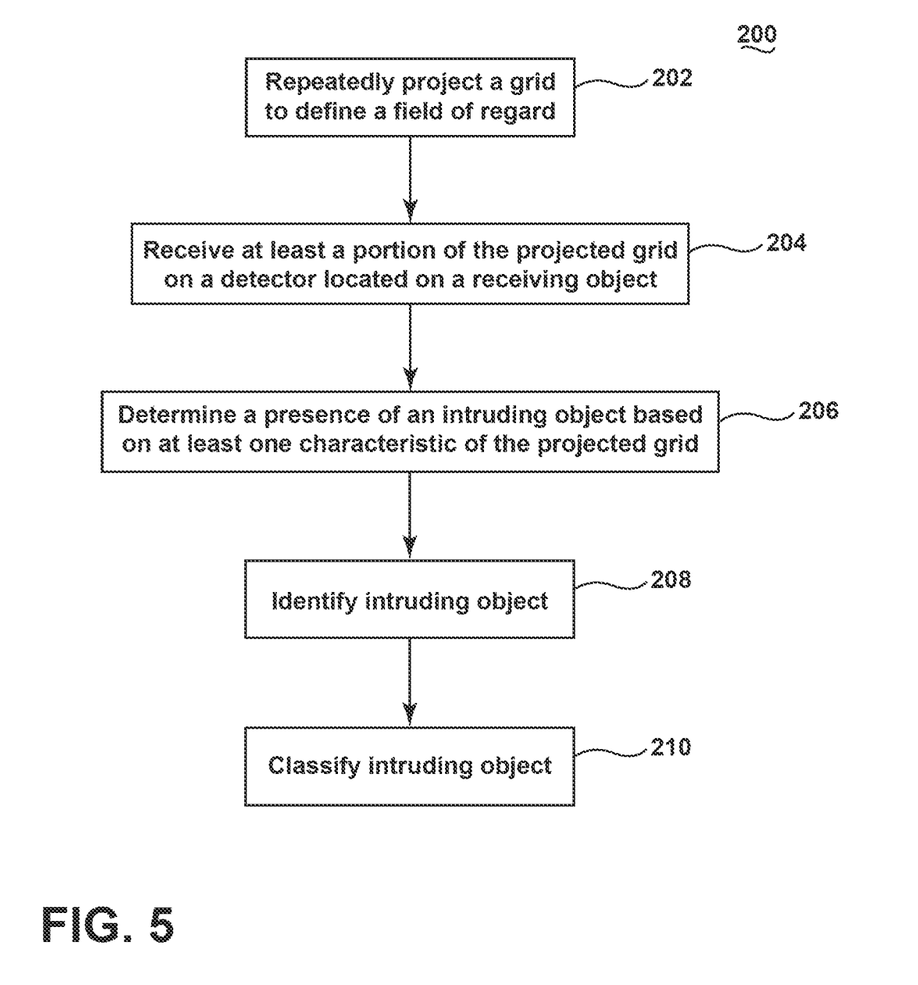
FIG. 5 is a flow chart of an embodiment of a method of detecting an intruding object.

It will also be understood that determining the presence of the intruding object(s) can be done solely by an intended receiver of the grid. For example, FIG. 5 illustrates a method of detecting an intruding object between a transmitting object and a receiving object that are navigating relative to each other using a relative navigation system, such as the previously illustrated relative navigation system 40. As with the previously described method, the method 200 begins with repeatedly projecting into space a set of lines defining a grid at 202 by a grid generator 10. The lines can be encoded with grid data configured to identify predetermined points on the grid. At 204, at least a portion of the projected grid is received on a detector module located on the receiving object, such as the detector module 16 located on the UAV 18. At 206, a presence of an intruding object located within the grid and between the transmitting and receiving objects is determined based on at least one characteristic of the projected grid. More specifically the detector module 16 on the UAV 18 can detect, by way of non-limiting examples, multi-path reflections and/or a loss of light from the grid that is caused by the intruding object and can determine a presence of the intruding object(s) based thereon.

At 208, the intruding object may be identified. Identification of the intruding object can include, but is not limited to, identifying what the object is and where the object is located. By way of non-limiting example, a number of grid points that are blocked by the intruding object or the amount of reduction in light can be indicative of size of the intruding object. In the case of detected retro-reflected grid information, either of the processors 48 and/or the remote processor 52 can be configured to determine an azimuth, elevation, or range of the intruding object from the retro-reflected grid information. More specifically, the encoded data in the retro-reflection may include azimuth, elevation, and range information and such information may be utilized to determine the azimuth, elevation, and range of the intruding object. In this manner, the processor 48 can be utilized in identifying further information regarding the intruding object. Position information for an intruding object can be determined by time displaced grid position information as well as by reception of retro reflected information. The information regarding the intruding object can then be communicated with intended receivers operating or planning to operate within the FOR 14.

At 210, the intruding object can be classified. This can include, but is not limited to, classifying the intruding object as either a known object or an unknown object or classifying its threat level. For example, if the intruding object blocks a large portion of the projected grid and such that the UAV 18 cannot reliably navigate then the intruding object can be determined to pose a threat that precludes the landing operation.

The methods described above are for exemplary purposes only and are not meant to limit the inventive embodiments in any way as it is understood that the portions of the method can proceed in a different logical order, additional or intervening portions can be included, or described portions of the method can be divided into multiple portions, or described portions of the method can be omitted without detracting from the described method.

The above-described embodiments provide a variety of benefits including that they can detect an intruding object within the field of regard of a relative navigation system, which can improve safety of operating within the field of regard. Further, the above-described embodiments can identify and classify the intruding obstacle to further improve safety of the operation. Alternate methods for providing navigation and obstacle detection information are more complex, expensive, and require greater size, weight, and power than the above described embodiments. In addition, alternative systems are less accurate and will have inherent data latencies due to the integration of two separate systems.

To the extent not already described, the different features and structures of the various embodiments can be used in combination with each other as desired. That one feature may not be illustrated in all of the embodiments and is not meant to be construed that it may not be, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of intrusion detection for a relative navigation system, the method comprising:
   repeatedly projecting, from a grid generator, a set of lines defining a grid in three dimensional space to define a field bounded by the projected grid and encoded with grid data configured to identify predetermined points on the grid; and
   determining a presence of an intruding object within the field.

2. The method of claim 1 wherein determining the presence of the intruding object includes detecting retro-reflected light or backscattered light reflected from the intruding object.

3. The method of claim 2 wherein determining the presence of the intruding object further includes forming a point cloud image from the detected light.

4. The method of claim 3 wherein the point cloud image is processed and the intruding object is identified.

5. The method of claim 1 wherein determining the presence of the intruding object includes detecting a multi-path reflection of at least a portion of the projected grid deflecting off the intruding object, by a detector module that is an intended receiver of the grid.

6. The method of claim 1 wherein determining the presence of the intruding object includes detecting that a portion of the generated grid is blocked or detecting a reduction in light intensity from the grid by a detector module that is an intended receiver of the grid.

7. The method of claim 1, further comprising projecting light, from a secondary light source, into the field and determining the presence of the intruding object based upon a reflection of the light.

8. The method of claim 1 wherein the projecting light from the secondary light source occurs between projections of the grid from the grid generator.

9. The method of claim 1 wherein determining the presence of the intruding object further includes determining an azimuth, elevation, or range of the intruding object from the grid generator.

10. The method of claim 1, further comprising classifying the intruding object as an obstacle to be avoided or a known object that provides a marker.

11. A method of detecting an intruding object, the method comprising:
    repeatedly projecting, from a grid generator located on a transmitting object, a set of lines defining a grid and encoded with grid data configured to identify predetermined points on the grid;
    receiving at least a portion of the projected grid on a detector module located on the receiving object; and
    determining a presence of an intruding object located within the grid and between the transmitting and receiving objects based on at least one characteristic of the projected grid.

12. The method of claim 11 wherein determining the presence of the intruding object includes detecting that a portion of the grid has been blocked by the intruding object.

13. A relative navigation system, comprising:
    a grid generator projecting into three dimensional space a relative navigation grid to define a field; and
    a detector module for detecting light and configured to output a signal related to the detected light; and
    a processor operably coupled to the detector module and configured to receive the signal and determine when the signal related to the detected light is indicative of the presence of an intruding object.

14. The system of claim 13 wherein the detector module is located near the grid generator.

15. The system of claim 14 wherein the detector module detects retro-reflected light or backscattered light reflected from the intruding object.

16. The system of claim 13 wherein the processor receives a signal related to the detected light and forms a point cloud image therefrom.

17. The system of claim 13 wherein the detector module is operably coupled to a receiving object that is an intended receiver of the grid and the detector module is configured to detect a multi-path reflection or a loss of light from the grid.

18. The system of claim 13, further comprising a secondary light source and wherein the detector module determines the presence of the intruding object based on a projection of the secondary light source.

19. The system of claim 18 wherein the secondary light source includes an unscanned laser dot, a scanned laser dot, or a flash laser.

20. The system of claim 13 wherein the processor is configured to determine an azimuth, elevation, or range of the intruding object from the grid generator.

* * * * *

UNITED STATES PATENT AND TRADEMARK OFFICE
CERTIFICATE OF CORRECTION

PATENT NO. : 9,435,635 B1
APPLICATION NO. : 14/633231
DATED : September 6, 2016
INVENTOR(S) : Feldmann et al.

Page 1 of 1

It is certified that error appears in the above-identified patent and that said Letters Patent is hereby corrected as shown below:

In the Specification

In Column 6, Line 51, delete "process 52," and insert -- processor 52, --, therefor.

In the Claims

In Column 10, Line 1, in Claim 8, delete "claim 1" and insert -- claim 7 --, therefor.

Signed and Sealed this
Third Day of January, 2017

Michelle K. Lee
*Director of the United States Patent and Trademark Office*